US006266195B1

(12) United States Patent
Shinohara

(10) Patent No.: US 6,266,195 B1
(45) Date of Patent: Jul. 24, 2001

(54) ZOOM LENS

(75) Inventor: Yoshikazu Shinohara, Omiya (JP)

(73) Assignee: Fuji Photo Optical Co., Ltd., Omiya (JP)

(*) Notice: Subject to any disclaimer, the term of this patent is extended or adjusted under 35 U.S.C. 154(b) by 0 days.

(21) Appl. No.: 09/531,838

(22) Filed: Mar. 20, 2000

(30) Foreign Application Priority Data

Mar. 30, 1999 (JP) .......................................... H11-087545

(51) Int. Cl.[7] .................................................. G02B 15/14
(52) U.S. Cl. .......................................... 359/686; 359/683
(58) Field of Search .................................. 359/686, 687, 359/688, 683, 684, 676, 354, 355–357

(56) References Cited

U.S. PATENT DOCUMENTS 5,151,820 * 9/1992 Sillitto et al. ........................ 359/354
6,069,743 * 5/2000 Nagata et al. ....................... 359/687
6,091,551 * 7/2000 Watanabe ............................ 359/676

FOREIGN PATENT DOCUMENTS

H8-21943 1/1996 (JP) .

* cited by examiner

*Primary Examiner*—Jordan M. Schwartz
(74) *Attorney, Agent, or Firm*—Arnold International; Bruce Y. Arnold

(57) ABSTRACT

A simple-structured zoom lens having four lens groups is disclosed wherein the zoom lens does not require refocusing after a zooming operation even when the wavelength of light being imaged is different from the design wavelength. The zoom lens includes, in order from the object side, a first lens group which has positive refractive power; a second lens group which has negative refractive power and is moved along an optical axis to accomplish zooming, a third lens group, and a fourth lens group having at least a portion thereof which is moveable along the optical axis during zooming, wherein an image surface is made to form at the same position as for a particular design wavelength when said zoom lens is used to image light at a different wavelength by moving said portion a specified distance in accordance with the wavelength of the incident light and the zoom ratio.

4 Claims, 7 Drawing Sheets

Embodiment 2

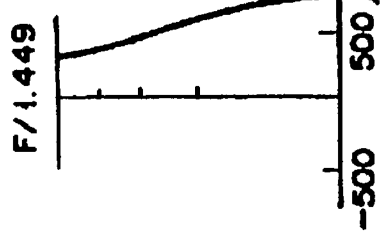
Fig. 4A
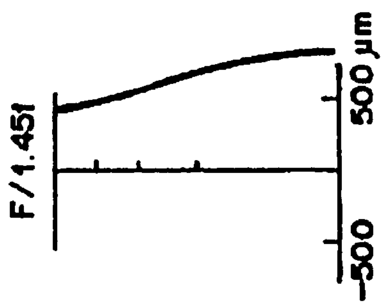
Fig. 4B
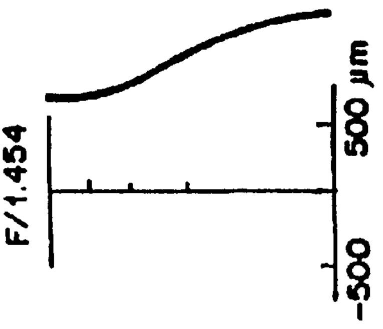
Fig. 4C
F/1.438
-500
500 µm
Fig. 4D
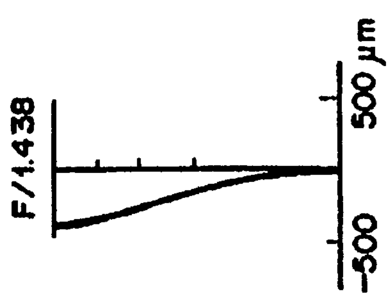
Fig. 4E
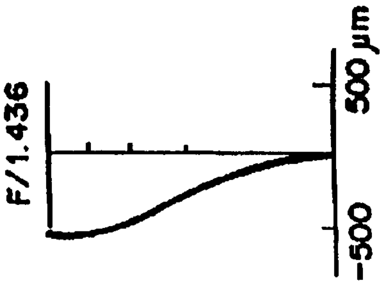
Fig. 4F

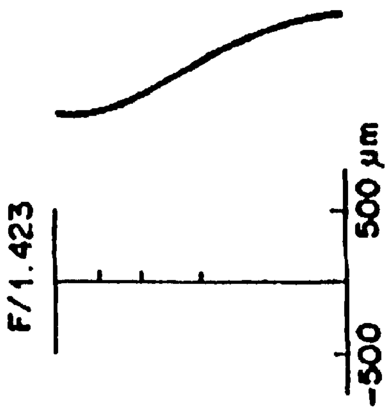
Fig. 5C
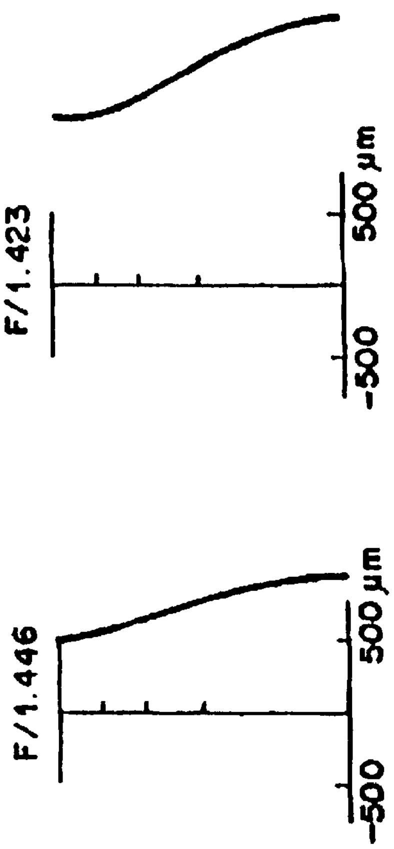
Fig. 5B
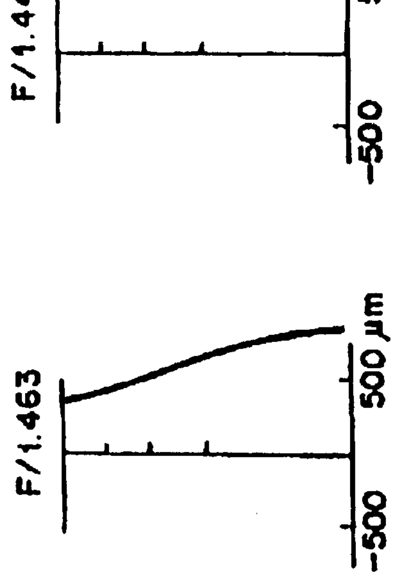
Fig. 5A
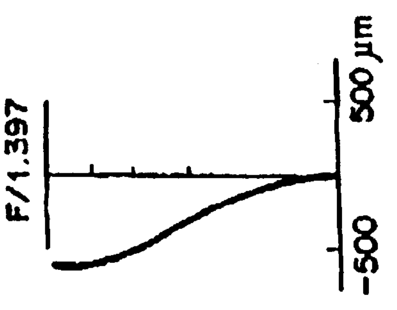
Fig. 5F
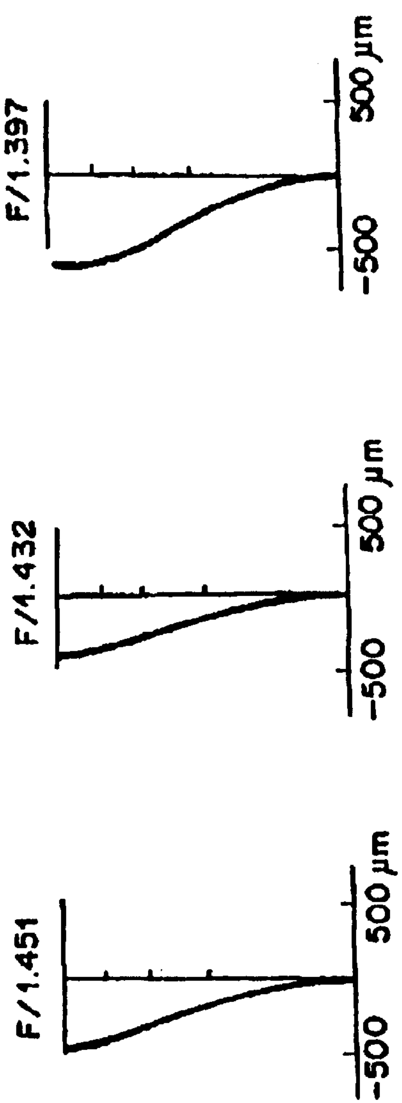
Fig. 5E
Fig. 5D

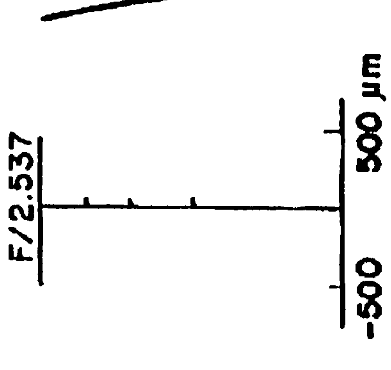
Fig. 6C
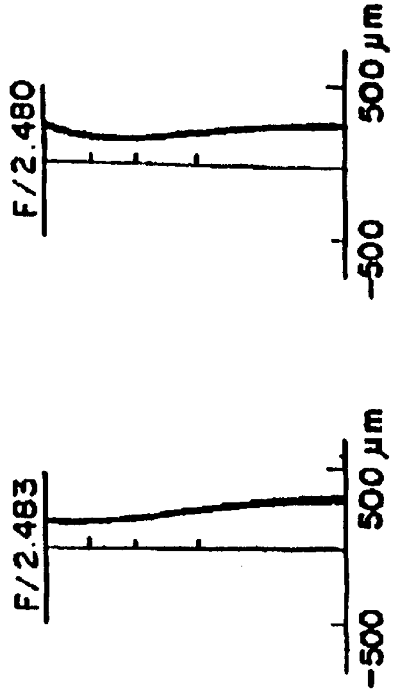
Fig. 6B
Fig. 6A
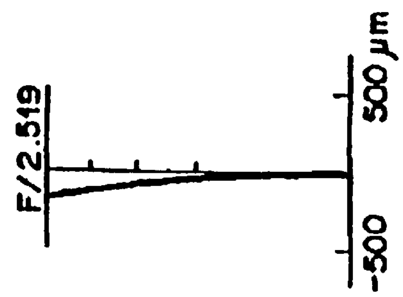
Fig. 6F
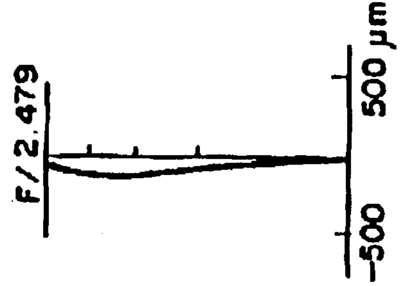
Fig. 6E
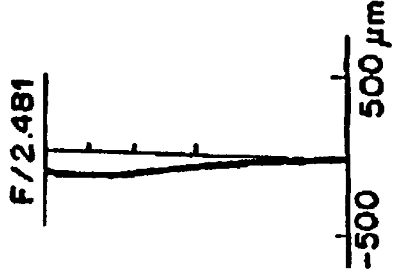
Fig. 6D

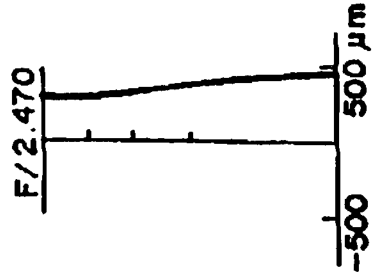
Fig. 7A
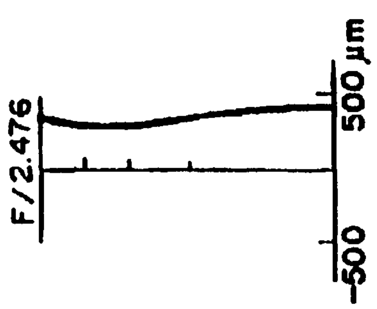
Fig. 7B
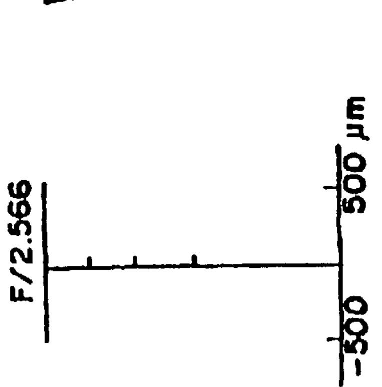
Fig. 7C
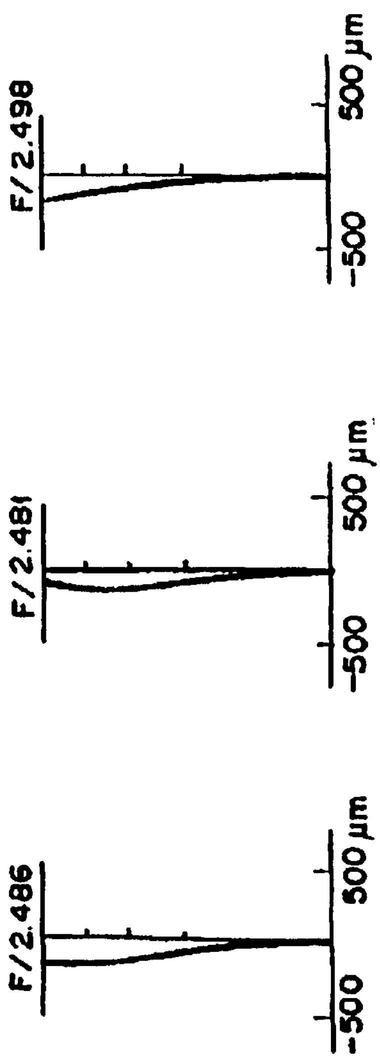
Fig. 7D
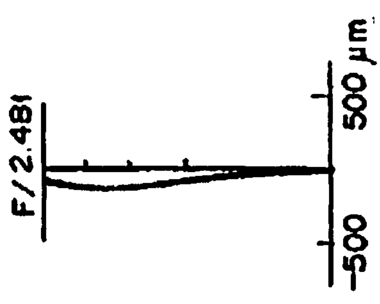
Fig. 7E
Fig. 7F

ZOOM LENS

BACKGROUND OF THE INVENTION

Conventionally, a zoom lens is designed in accordance with a usual range of wavelengths to be used in imaging an object, and the zoom lens forms an image at a specified image-forming surface at which a detector (e.g., film or detector array) is positioned. However, there has been a problem in that, when a conventional zoom lens is used outside the range of wavelengths for which it was designed, the image no longer is formed at the location of the detector. Therefore, when the zoom lens is used outside the range of wavelengths for which it was designed, the image gets out of focus every time the zoom ratio is changed; thus, refocusing is required.

Some zoom lenses alleviate the inconvenience of having to refocus after each zoom operation when the zoom lens is used at another wavelength range by moving the film plane or the CCD array surface to adjust for the different wavelength range. Other zoom lenses alleviate this inconvenience by inserting a prism between the lens element nearest the image-side and the image-forming surface in order to adjust the optical path length for the change in wavelength range. However, these adjustments make it more difficult to operate the zoom lens.

Japanese Laid-Open Patent Application No. H8-21943 discloses a zoom lens which does not require re-focusing after a zooming operation even when the zoom lens is used outside the range of wavelengths for which it was designed. The zoom lens uses a frame of moving patterns which automatically adjusts the position of certain lens elements in accordance with the wavelength of incident light. Thus, re-focusing is not required every time the zoom ratio is changed despite the zoom lens being used for a different range of wavelengths. However, there is a problem in that the structure of such a zoom lens is complex and two sets of cam grooves are required in order to enable adjustment of certain lens elements that are repositioned to adjust for the change in wavelength. Therefore, further resolution of the problem has been sought.

BRIEF SUMMARY OF THE INVENTION

The present invention relates to a zoom lens, more particularly, to a zoom lens used in a TV camera or a still camera, which can be used for multiple ranges of wavelength, such as for visible light or for near-infrared light. The object of the present invention is to provide a simple-structured zoom lens which does not require re-focusing every time a zoom operation is performed, even when the zoom lens is used outside its normal wavelength range.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 4A–4F show, for near-infrared light having a wavelength of 800 nm, the spherical aberration of the zoom lens of Embodiment 1 for various zoom ratios before and after movement of a moveable portion of the fourth lens group to correct for the wavelength being different than a standard wavelength (546.1 nm) for which the zoom lens was designed, with FIGS. 4A–4C being before the movement at zoom ratios of 1, 4 and 13, respectively, and FIGS. 4D–4F being after the movement at zoom ratios of 1, 4 and 13, respectively, FIGS. 5A–5F show, for near-infrared light having a wavelength of 900 nm, the spherical aberration of the zoom lens of Embodiment 1 for various zoom ratios before and after movement of a moveable portion of the fourth lens group to correct for the wavelength being different than a standard wavelength (546.1 nm) for which the zoom lens was designed, with FIGS. 5A–5C being before the movement at zoom ratios of 1, 4 and 13, respectively, and FIGS. 5D–5F being after the movement at zoom ratios of 1, 4 and 13, respectively, FIGS. 6A–6F show, for near-infrared light having a wavelength of 800 nm, the spherical aberration of the zoom lens of Embodiment 2 for various zoom ratios before and after movement of the fourth lens group to correct for the wavelength being different than a standard wavelength (546.1 nm) for which the zoom lens was designed, with FIGS. 6A–6C being before the movement at zoom ratios of 1, 4 and 10, respectively, and FIGS. 6D–6F being after the movement at zoom ratios of 1, 4 and 10, respectively, FIGS. 7A–7F show, for near-infrared light having a wavelength of 900 nm, the spherical aberration of the zoom lens of Embodiment 2 for various zoom ratios before and after movement of the fourth lens group to correct for the wavelength being different than a standard wavelength (546.1 nm) for which the zoom lens was designed, with FIGS. 7A–7C being before the movement at zoom ratios of 1, 4 and 10, respectively, and FIGS. 7D–7F being after the movement at zoom ratios of 1, 4 and 10, respectively.

DETAILED DESCRIPTION

Figure 2:
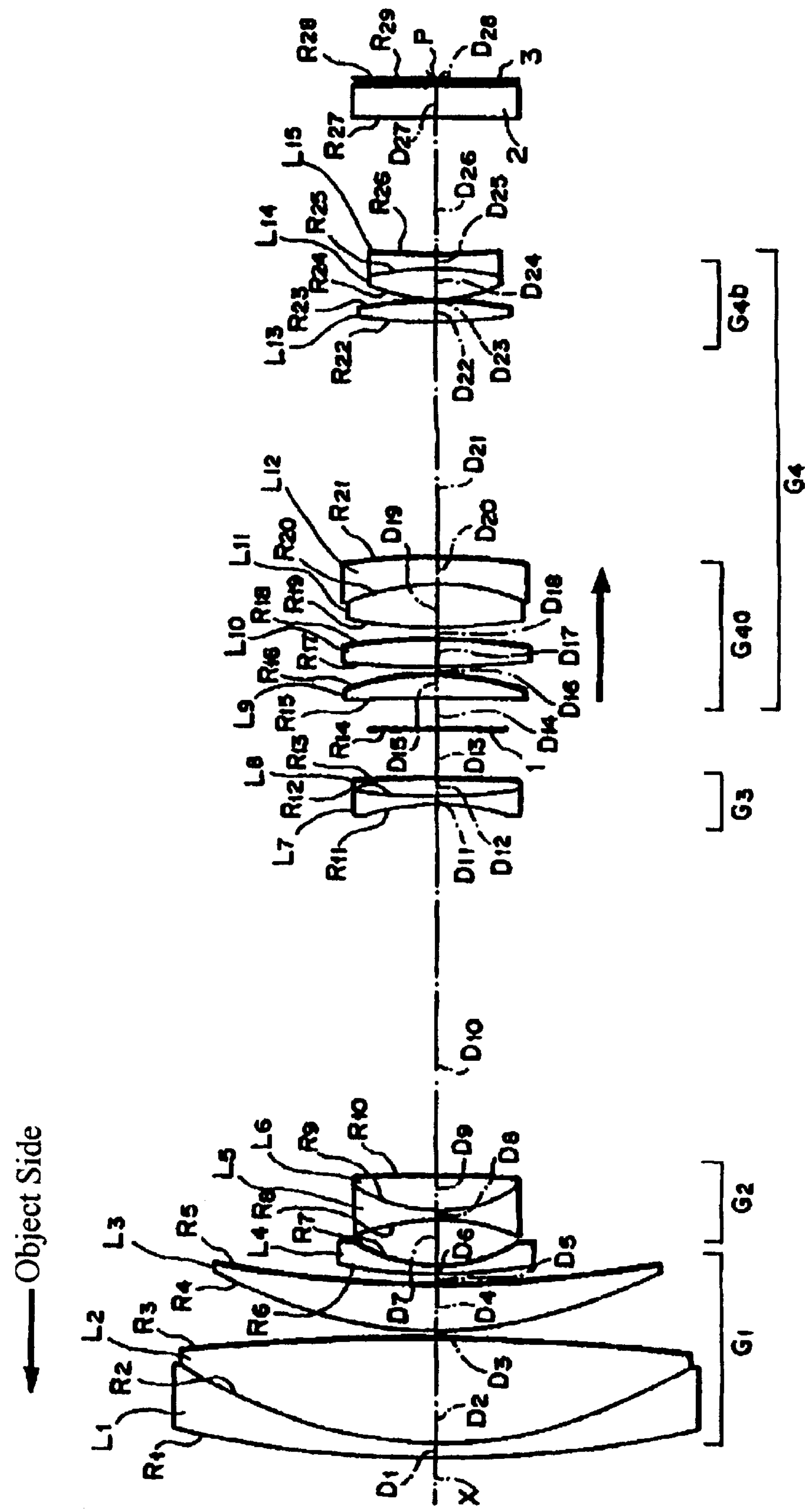
FIG. 2 shows the lens element configuration of Embodiment 1 of the present invention.
Figure 3:
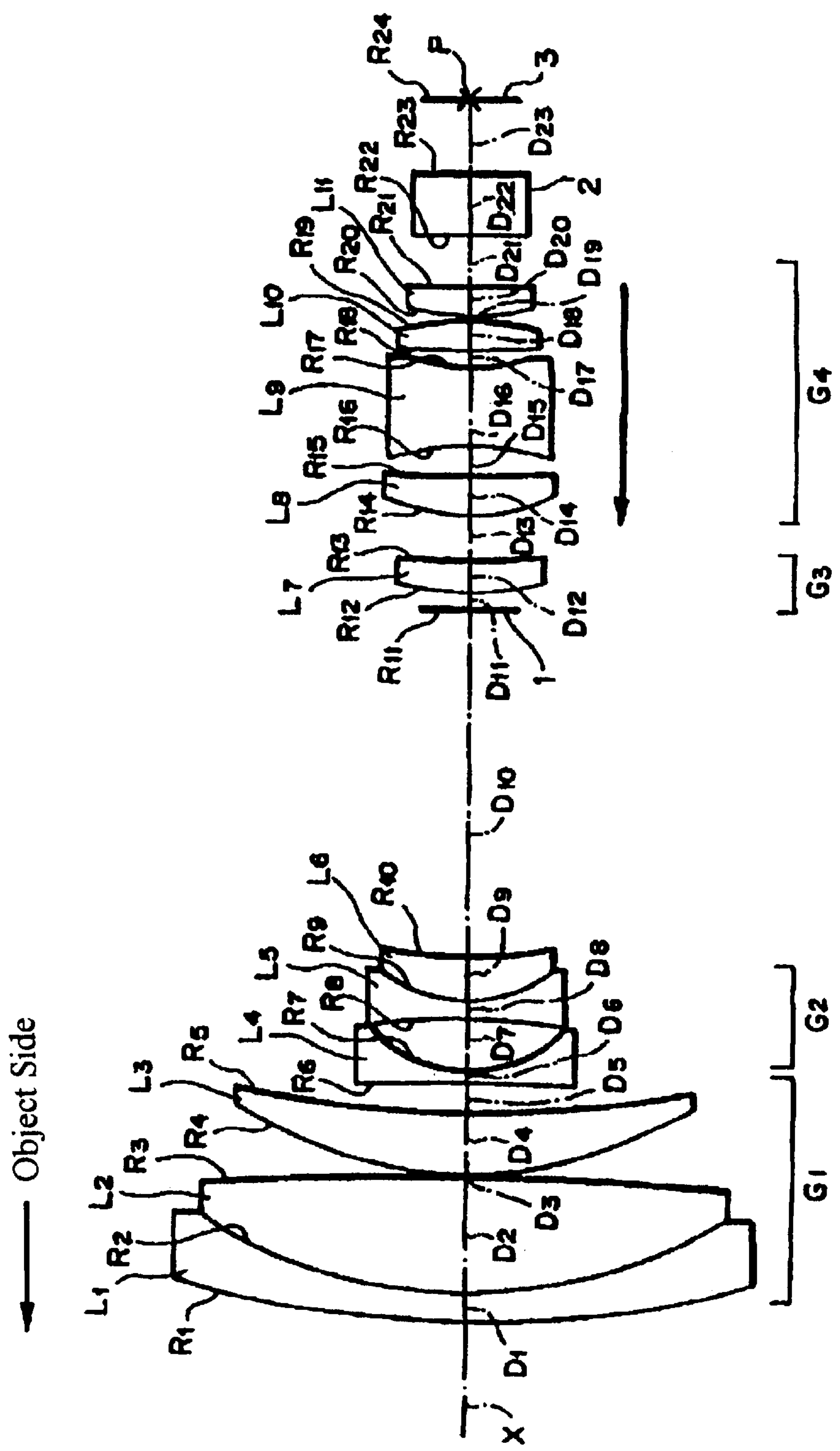
FIG. 3 shows the lens element configuration of Embodiment 2 of the present invention.

As shown in FIGS. 2 and 3, the zoom lens of the present invention includes, in order from the object side, a first lens group $G_1$ which has positive refractive power, a second lens group $G_2$ which has negative refractive power and moves along it s optical axis to accomplish zooming, a third lens group $G_3$ (which may have either positive or negative refractive power) and may move along the optical axis to correct for what otherwise would be a shifting of the image surface at the time of zooming, or may be fixed; and a fourth lens group $G_4$ at least a portion of which moves with zooming in order to prevent shifting of the image surface which otherwise would accompany zooming and a change in wavelength from the design wavelength.

A stop 1 may be placed on the object side of the third lens group $G_3$, or between the third lens group $G_3$ and the object side of the fourth lens group $G_4$, and a filter 2 such as a UV cut-off filter is placed on the image-side of the fourth lens group $G_4$. A light beam that enters from the object side is formed into an image at image surface 3 that is positioned along the optical axis X at point P.

As shown in FIGS. 2 and 3, all or a portion of the fourth lens group of the present invention is moveable in order to keep the position of the image surface from shifting due to zooming and the incident light being at other than the design wavelength. As illustrated in FIG. 3, all of the fourth lens group may be moved in order to keep the image surface at a constant position despite zooming and the incident light being at other than the design wavelength. Or, as illustrated in FIG. 2, the fourth lens group $G_4$ may be divided into two subgroups, $G_4$a and $G_4$b, wherein only the object-side subgroup $G_4$a is moved in order to keep the image surface at a constant position despite zooming and the incident light being at other than the design wavelength.

Figure 1A:
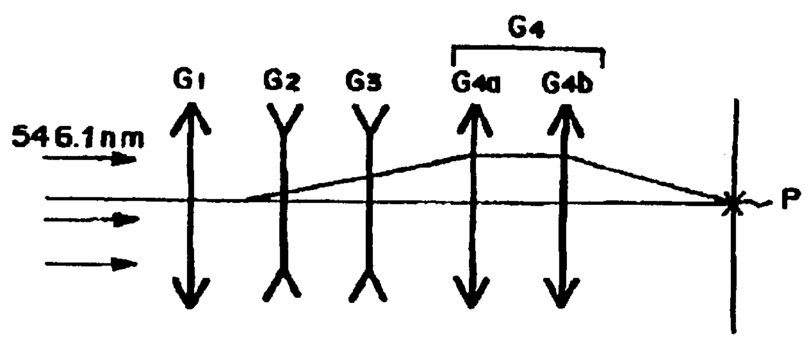
FIGS. 1A–1C are schematic diagrams which illustrate an image being formed at a position P under various conditions.

Referring to FIG. 1A as an example, each lens group $G_1$–$G_4$ is arranged for a design (i.e., standard) wavelength of 546.1 nm. Thus the zoom lens is designed to focus an object onto a stationary surface (i.e., the image surface, at which a detector is located) when the incident light has a wavelength of 546.1 nm.

Figure 1B:
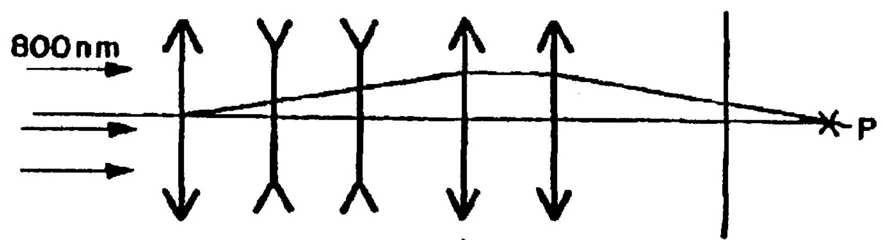

As illustrated in FIG. 1B, the image-forming position P shifts to the right for wavelengths that are longer than the design wavelength, with the position P illustrated being the image point when the incident light has a wavelength of 800 nm.

Figure 1C:
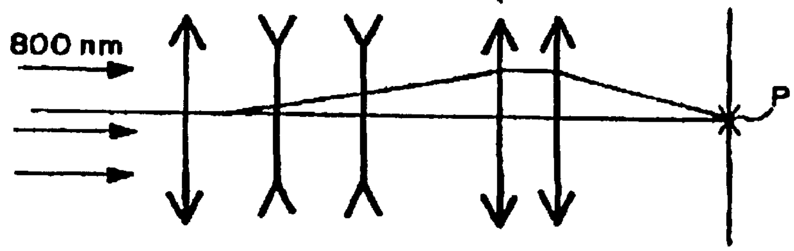

As illustrated FIG. 1C, the image-forming position P can be repositioned to lie at the same position as for the design wavelength. For example, in the case where the fourth lens group is formed of an object-side subgroup $G_4$a and an image-side subgroup $G_4$b, only a portion of the fourth lens group need be moved toward the image surface in order to stabilize the position of the image surface when the incident light has a wavelength of 800 nm (as compared to the incident light being at 546.1 nm).

There are two methods to move the object-side subgroup $G_4$a of the fourth lens group $G_4$. The first method is to employ another cam groove which is different from the cam groove that moves the second lens group $G_2$ or the fourth lens group $G_4$ at the time of zooming. The second method is to have feedback of the distance moved by the zooming operation and to axially drive the object-side lens subgroup $G_4$a in order to adjust for the light being at other than the design wavelength.

For instance, in the case of moving the object-side subgroup $G_4$a by a motor, the motor can be controlled by a microcomputer whose memory has data stored in advance for the moving distances for multiple wavelengths. In this case, a microcomputer functions to adjust the moving distance.

Also, in the case of switching from one incident wavelength to another, there are two methods proposed. A first method is to employ a sensor which is capable of detecting the wavelength of incident light on the zoom lens and to automatically switch the position of a compensating lens component based on the wavelength detected by the sensor. A second method is to manually switch the position of a compensating lens component based on the wavelength range being used based on knowledge by the operator.

Two specific embodiments of the invention will now be discussed in detail.

Embodiment 1

As shown in FIG. 2, the first lens group $G_1$ is formed, in order from the object side, of a first lens element $L_1$ of negative meniscus shape with its convex surface on the object side, a second lens element $L_2$ that is biconvex, and a third lens element $L_3$ of positive meniscus shape with its convex surface on the object side. The first lens element $L_1$ and the second lens element $L_2$ are joined.

The second lens group $G_2$ is formed, in order from the object side, of a fourth lens element $L_4$ that has a negative meniscus shape with its convex surface on the object side, a fifth lens element $L_5$that is biconcave, and a sixth lens element $L_6$ that is biconvex. The fifth lens element $L_5$ and the sixth lens element $L_6$ are joined.

The third lens group $G_3$ is formed, in order from the object side, of a seventh lens element $L_7$that is biconcave and an eighth lens element $L_8$ that is biconvex. The seventh lens element $L_7$ and the eighth lens element $L_8$ are joined.

The fourth lens group $G_4$ is formed, in order from the object side, of an object-side subgroup $G_4$a and an image-side subgroup $G_4$b The object-side subgroup $G_4$a is movable along the optical axis X to compensate for a change in zoom ratio as well as for a change in wavelength of the incident light. When light with wavelengths longer than the design wavelength is imaged, the moving member is moved a specified distance toward the image surface in order to keep the image surface from moving as a result of the change in wavelength.

The object-side subgroup $G_4$a is formed of, in order from the object side, a ninth lens element $L_9$ having a positive meniscus shape with its convex surface on the image side, a tenth lens element $L_{10}$ and an eleventh lens element $L_{11}$ that are each biconvex, and a twelfth lens element $L_{12}$ of negative meniscus shape with its convex surface on the image side. The eleventh lens element $L_{11}$ and the twelfth lens element $L_{12}$ are joined.

The image-side subgroup $G_4$b, is formed of, in order from the object side, a thirteenth lens element $L_{13}$ and a fourteenth lens element $L_{14}$ that are each biconvex, and a fifteen lens element $L_{15}$ that is biconcave. The fourteen lens element $L_{14}$ and the fifteen lens element $L_{15}$ are joined.

Table 1 below lists, for Embodiment 1, the surface number #, in order from the object side, the radius of curvature R (in mm) of each surface, the on-axis surface spacing D, as well as the index of refraction $N_d$ and the Abbe number $\nu_d$ (at the sodium d line) of each lens element. The bottom portion of the table indicates the spacings (in mm) between the lens groups (i.e, the values of D5, D10 and D13) at magnification ratios of 1, 4, and 13, respectively.

TABLE 1

| # | R | D | $N_d$ | $V_d$ |
|---|---|---|---|---|
| 1 | 153.8851 | 1.8 | 1.80518 | 25.4 |
| 2 | 56.822 | 12.29879 | 1.671 | 57.2 |
| 3 | −283.192 | 0.87806 | | |
| 4 | 53.1924 | 6.0201 | 1.6968 | 55.6 |
| 5 | 147.2384 | D5 (variable) | | |
| 6 | 61.5379 | 0.9 | 1.83481 | 42.7 |
| 7 | 17.3617 | 5.99065 | | |
| 8 | −24.4566 | 1 | 1.804 | 46.6 |
| 9 | 17.012 | 4.4668 | 1.84666 | 23.9 |
| 10 | −270.314 | D10 (variable) | | |
| 11 | −26.1669 | 1 | 1.804 | 46.6 |
| 12 | 59.7 | 2.48958 | 1.84666 | 23.9 |
| 13 | −240.224 | D13 (variable) | | |
| 14 | ∞ (stop) | 4.18266 | | |
| 15 | −214.521 | 2.25905 | 1.62041 | 60.3 |
| 16 | −41.3048 | 1.12621 | | |
| 17 | 126.2844 | 3.69456 | 1.51742 | 52.2 |
| 18 | −69.6535 | 1.02702 | | |
| 19 | 51.136 | 5.61984 | 1.51742 | 52.2 |
| 20 | −26.2811 | 3.28335 | 1.80518 | 25.4 |
| 21 | −113.245 | 29.83082 | | |
| 22 | 56.4906 | 2.82022 | 1.64328 | 47.8 |
| 23 | −47.7222 | 0.08884 | | |
| 24 | 22.5869 | 3.58024 | 1.51823 | 59 |
| 25 | −39.6143 | 1.82308 | 1.80518 | 25.4 |
| 26 | 118.1384 | 16.75 | | |
| 27 | ∞ | 4 | 1.51633 | 64.1 |
| 28 | ∞ | 0.20606 | | |
| 29 | (image surface) | | | |

| | D5 | D10 | D13 |
|---|---|---|---|
| 1X | 1.025 | 46.032 | 5.9857 |
| 4X | 32.949 | 9.999 | 10.0954 |
| 13X | 46.118 | 4.950 | 1.975128 |

Table 2 below lists the amount of axial shift in position (in mm) an image point undergoes when the incident light has a wavelength of 800 nm or 900 nm, as compared to the image position for a wavelength 546.1 nm (the design wavelength) for magnifications 1×, 4× and 13×, respectively.

TABLE 2

| | 800 (nm) | 900 (nm) |
|---|---|---|
| 1X | 0.1561 | 0.2108 |
| 4X | 0.1775 | 0.2396 |
| 13X | 0.3260 | 0.4586 |

Table 3 below lists the distance (in mm) the object-side subgroup $G_4a$ is moved toward the image surface in order to maintain the image surface at the position of a design wavelength (i.e., 546.1 nm) when incident light has a wavelength of 800 nm or 900 nm, respectively, at magnification ratios of 1×, 4×, and 13×.

TABLE 3

| | 800 (nm) | 900 (nm) |
|---|---|---|
| 1X | 0.1796 | 0.1839 |
| 4X | 0.1812 | 0.1862 |
| 13X | 0.1928 | 0.2032 |

In the present embodiment, as shown above in Table 3, by moving the object-side subgroup $G_4a$ the distance indicated (which depends on the zoom ratio and the wavelength of the incident light), the image surface is maintained at a fixed position despite the incident light being at other than the design wavelength of 546.1 nm.

FIGS. 4A–FIG. 5F show the spherical aberration of the zoom lens of Embodiment 1, under various conditions. FIGS. 4A–4F are for the incident light having a wavelength of 800 nm. FIGS. 4A–4C show the spherical aberration without moving the object-side subgroup $G_4a$, at magnification ratio's of 1×, 4×, and 13×, respectively. FIGS. 4D–4F show the spherical aberration when the object-side subgroup $G_4a$ is moved the appropriate amount for the incident light having a wavelength of 800 nm, at magnification ratios of 1×, 4×, and 13×, respectively. FIGS. 5A–5F are for the incident light having a wavelength of 900 nm. FIGS. 5A–5C show the spherical aberration without moving the object-side subgroup $G_4a$, at magnification ratios of 1×, 4×, and 13×, respectively, and FIGS. 5D–5F show the spherical aberration when the object-side subgroup $G_4a$ is moved the appropriate amount for the incident light having a wavelength of 900 nm, at magnification ratios of 1×, 4×, and 13×, respectively.

As clearly indicated from these figures, the spherical aberration is satisfactorily corrected over the entire range of zoom by moving a portion of the fourth lens group $G_4$ (i.e., subgroup $G_4a$) in accordance with the wavelength of the incident light and the zoom ratio.

Embodiment 2

As shown in FIG. 3, the zoom lens of this embodiment includes, in order from the object side, a first lens group $G_1$ which has positive refractive power and is fixed in position, a second lens group $G_2$ which has negative refractive power and which moves along the optical axis to accomplish zooming, a third lens group $G_3$ which is held stationary at the time of zooming, and a fourth lens group $G_4$ which moves along the optical axis to correct for a shifting of the image surface which otherwise would occur with zooming and with the incident light having a wavelength different from a design wavelength.

An aperture stop 1 is placed between the second lens group $G_2$ and the third lens group $G_3$, and a filter 2 such as a UV blocking filter is placed on the image side of the fourth lens group $G_4$. A beam of light from an object is formed into an image on image surface 3 positioned at P along the optical axis X.

The first lens group $G_1$ includes, in order from the object side, a first lens element $L_1$ of negative meniscus shape with its convex surface on the object side, a second lens element $L_2$ that is biconvex, a third lens element $L_3$ of positive meniscus shape with its convex surface on the object side. The first lens element $L_1$ and the second lens element $L_2$ are joined.

The second lens group $G_2$, includes, in order from the object side, a fourth lens element $L_4$ and a fifth lens element $L_5$ that are each biconcave, and a sixth lens element $L_6$ that has a positive meniscus shape, with its convex surface on the object side. The fifth lens element $L_5$ and the sixth lens element $L_6$ are joined.

The third lens group $G_3$ includes, in order from the object side, a seventh lens element $L_7$ of positive meniscus shape with its convex surface on the object side.

The fourth lens group $G_4$, includes, in order from the object side, an eighth lens element $L_8$ of positive meniscus shape, with its convex surface on the object side, a ninth lens element $L_9$ that is biconcave and a tenth lens element $L_{10}$ that is biconvex, and an eleventh lens element $L_{11}$ that is plano-convex with the convex surface on the object side. A stop 1 is positioned on the object side of the third lens group $G_3$, a filter 2 such as a UV cut-off filter is placed on the image-side of the fourth lens group $G_4$, and the image surface 3 is positioned along the optical axis X at P.

Table 4 below lists, for Embodiment 2, the surface number #, in order from the object side, the radius of curvature R (in mm) of each surface, the on-axis surface spacing D, as well as the index of refraction $N_d$ and the Abbe number $V_d$ (at the sodium d line) of each lens element. The bottom portion of the table indicates the spacings (in mm) between the lens groups (i.e, the values of D5, D10, D13 and D21) at magnification ratios of 1, 4, and 10, respectively.

TABLE 4

| # | R | D | $N_d$ | $V_d$ |
|---|---|---|---|---|
| 1 | 83.3485 | 2.42 | 1.84666 | 23.8 |
| 2 | 38.932 | 9.27 | 1.713 | 53.9 |
| 3 | −329.307 | 0.19 | | |
| 4 | 33.41 | 4.94 | 1.62041 | 60.3 |
| 5 | 87.8513 | D5 (variable) | | |
| 6 | −210.767 | 1.01 | 1.834 | 37.2 |
| 7 | 10.3759 | 4.13 | | |
| 8 | −49.962 | 1.46 | 1.51823 | 58.9 |
| 9 | 10.652 | 3.62 | 1.84666 | 23.8 |
| 10 | 33.6615 | D10 (variable) | | |
| 11 | ∞ (stop) | 1.22402 | | |
| 12 | 19.6292 | 2.89 | 1.744 | 44.8 |
| 13 | 99.2266 | D13 (variable) | | |
| 14 | 15.6381 | 3.16 | 1.62041 | 60.3 |
| 15 | 191.4499 | 2.23 | | |
| 16 | −22.6145 | 6.55 | 1.84666 | 23.8 |
| 17 | 15.5523 | 1.01 | | |
| 18 | 38.9997 | 2.68 | 1.713 | 53.9 |
| 19 | −22.4879 | 0.14 | | |
| 20 | 16.1943 | 2.59 | 1.755 | 52.3 |
| 21 | ∞ | D21 (variable) | | |
| 22 | ∞ | 5 | 1.5188 | 64.2 |
| 23 | ∞ | 5.75563 | | |
| 24 | ∞ (image) | 0 | | |

| | D5 | D10 | D13 | D21 |
|---|---|---|---|---|
| 1X | 2.509 | 28.127 | 3.945 | 4.000 |
| 4X | 13.660 | 16.976 | 2.129 | 5.816 |
| 10X | 28.920 | 1.716 | 7.612 | 0.333 |

Table 5 below lists, for Embodiment 2, the amount of axial shift in position (in mm) an image point undergoes when the incident light has a wavelength of 800 nm or 900 nm, as compared to the image position for a wavelength 546.1 nm (the design wavelength) for magnifications 1×, 4× and 10×, respectively.

TABLE 5

| | 800 (nm) | 900 (nm) |
|---|---|---|
| 1X | 0.0825 | 0.1171 |
| 4X | 0.0678 | 0.1033 |
| 10X | 0.3629 | 0.5079 |

Table 6 below lists the distance (in mm) the lens group $G_4$ is moved toward the object side in order to maintain the image surface at the position of a design wavelength (i.e., 546.1 nm) when incident light has a wavelength of 800 nm or 900 nm, respectively, at magnification ratios of 1×, 4×, and 10×.

TABLE 6

| | 800 (nm) | 900 (nm) |
|---|---|---|
| 1X | −0.0035 | −0.0049 |
| 4X | −0.0028 | −0.0042 |
| 10X | −0.0168 | −0.0233 |

In the present embodiment, as shown above in Table 6, by moving the lens group $G_4$ the distance indicated (which depends on the zoom ratio and the wavelength of the incident light), the image surface is maintained at a fixed position despite the incident light being at other than the design wavelength of 546.1 nm.

FIGS. 6A–FIG. 7F show the spherical aberration of the zoom lens of Embodiment 2, under various conditions. FIGS. 6A–6F are for the incident light having a wavelength of 800 nm. FIGS. 6A–6C show the spherical aberration without moving the lens group $G_4$, at magnification ratios of 1×, 4×, and 10×, respectively. FIGS. 6D–6F show the spherical aberration when the lens group $G_4$ is moved the appropriate amount for the incident light having a wavelength of 800 nm, at magnification ratios of 1×, 4×, and 10×, respectively. FIGS. 7A–7F are for the incident light having a wavelength of 900 nm. FIGS. 7A–7C show the spherical aberration without moving the lens group $G_4$, at magnification ratios of 1×, 4×, and 10×, respectively, and FIGS. 7D–7F show the spherical aberration when the lens group $G_4$ is moved the appropriate amount for the incident light having a wavelength of 900 nm, at magnification ratios of 1×, 4×, and 10×, respectively.

As is clearly indicated from these figures, the spherical aberration is satisfactory corrected over the entire range of zoom by moving the fourth lens group $G_4$ in accordance with the wavelength of incident light and the zoom ratio.

As described above, according to the zoom lens in the present invention, at least a portion of the fourth lens group is a moving member that is moved axially so that the image forms at a position that is the same as for a design wavelength despite the lens being used to image light of a different wavelength. By moving at least a portion of the fourth lens group in accordance with the wavelength of the incident light, there is no need to refocus the system every time a zooming operation is performed even when the zoom lens is used at a different wavelength. Moreover, a system to move the moving member in accordance with the wavelength of incident light will not be complex, so the production of the zoom lens is easy and the cost is reduced.

The invention being thus described, it will be obvious that the same may be varied in many ways. Such variations are not to be regarded as a departure from the spirit and scope of the invention. Rather the scope of the invention shall be defined as set fourth in the following claims and their legal equivalents. All such modifications as would be obvious to one skilled in the art are intended to be included within the scope of the following claims.

What is claimed is:

1. A zoom lens consisting of four lens groups, in order from the object side, as follows:

a first lens group which has positive refractive power;

a second lens group which has negative refractive power and is moved along an optical axis to accomplish zooming;

a third lens group; and a fourth lens group having at least a portion thereof which is moveable along the optical axis during zooming, to thereby cause an image surface to form at the same position as for a particular design wavelength when said zoom lens is used to image light at a different wavelength by moving said portion a specified distance in accordance with the wavelength of the incident light and the zoom ratio.

2. The zoom lens of claim 1, wherein the third lens group moves along the optical axis to correct a shifting of the image surface which otherwise would accompany zooming.

3. The zoom lens of claim 1, wherein the third lens group is held stationary at the time of zooming.

4. The zoom lens of claim 3, wherein the entirety of the fourth lens group is moveable along the optical axis during zooming.

* * * * *

UNITED STATES PATENT AND TRADEMARK OFFICE
CERTIFICATE OF CORRECTION

PATENT NO. : 6,266,195 B1
DATED : July 24, 2001
INVENTOR(S) : Shinohara

It is certified that error appears in the above-identified patent and that said Letters Patent is hereby corrected as shown below:

Column 2,
Line 44, change "it s" to -- its --;

Column 3,
Line 17, after "As illustrated" insert -- in --;

Column 4,
Line 3, insert a period after "$G_4b$";
Line 19, change "fifteen" to -- fifteenth --;
Line 20, change "fourteen" to -- fourteenth --;
Line 21, change "fifteen" to -- fifteenth --; and Column 5,
Line 33, change "ratio's" to -- ratios --.

Signed and Sealed this

Twenty-sixth Day of February, 2002

*Attest:*

JAMES E. ROGAN
*Director of the United States Patent and Trademark Office*

*Attesting Officer*